Figure 1:
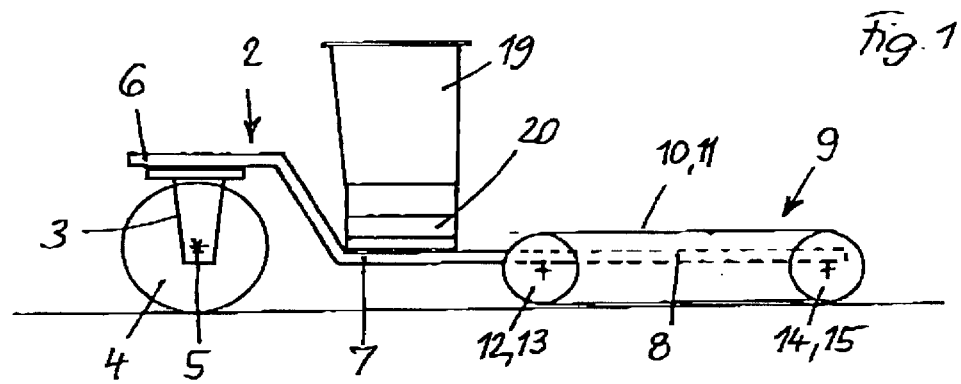

United States Patent [19]
Horsch

[11] Patent Number: 6,076,620
[45] Date of Patent: Jun. 20, 2000

[54] AGRICULTURAL MACHINE

[76] Inventor: Michael Horsch, Gut Sitzenhof 1, 92421, Schwandorf, Germany

[21] Appl. No.: 09/026,559

[22] Filed: Feb. 20, 1998

[30] Foreign Application Priority Data

Feb. 21, 1997 [DE] Germany ............................ 197 06 956
Jul. 18, 1997 [DE] Germany ............................ 197 30 825

[51] Int. Cl.$^7$ ................................................. B62D 55/00
[52] U.S. Cl. ......................... 180/9.1; 180/9.23; 180/9.36; 180/14.1
[58] Field of Search ..................... 180/9.1, 9.23, 180/9.36, 24.11, 15, 900, 210, 9.34, 9.38, 9.22, 9.25, 19.2, 7.1, 8.2, 9.64, 9.62, 14.1, 14.2, 14.3, 235; 305/165, 185, 20, 169, 33, 15, 120

[56] References Cited

U.S. PATENT DOCUMENTS

| 1,288,203 | 12/1918 | Rodin . | |
|---|---|---|---|
| 2,141,530 | 12/1938 | Guidruz . | |
| 2,263,028 | 11/1941 | Brownell . | |
| 2,466,236 | 4/1949 | Hecker . | |
| 2,572,399 | 10/1951 | Sklovsky et al. . | |
| 2,618,349 | 11/1952 | Ludema . | |
| 2,875,839 | 3/1959 | Spinks, Jr. . | |
| 3,446,302 | 5/1969 | Schoonover . | |
| 3,933,214 | 1/1976 | Guibord et al. . | |
| 4,304,313 | 12/1981 | Van der Lely | ........................ 180/9.36 |
| 4,635,760 | 1/1987 | Krueger et al. | ........................ 180/9.26 |
| 5,273,126 | 12/1993 | Reed et al. | ............................. 180/9.21 |
| 5,318,141 | 6/1994 | Hansen | .................................... 180/9.21 |
| 5,533,587 | 7/1996 | Dow et al. . | |

FOREIGN PATENT DOCUMENTS

| 2102396 | 4/1972 | France | .................................... 180/9.1 |
|---|---|---|---|
| 666498 | 10/1938 | Germany | ............................... 180/9.1 |
| 0035725 | 3/1954 | Poland | .................................... 180/9.1 |
| 786130 | 10/1957 | United Kingdom | ................... 180/9.1 |

Primary Examiner—Douglas C. Butler
Attorney, Agent, or Firm—Hoffman Wasson & Gitler P.C.

[57] ABSTRACT

An agricultural machine with a loading area above the rear axle assembly, a driver's cabin between front axle and rear axle assembly, an engine within the front area of the vehicle and a front frame associated to the front axle assembly as well a rear frame associated to the rear axle assembly is structured in such a manner that the rear axle assembly is provided with a travelling mechanism or alternatively a crawler unit preferably a crawler belt unit, with low loading area and with a swinging axle; the front axle assembly is provided with single tires or with a travelling mechanism resp. a crawler belt unit, the frame of the crawler belt unit associated to the rear axle assembly is available to its full length and width for net superstructures of the machine, the length of the crawler belt unit and the supporting crawler belts is larger than the width of the crawler unit, the diameter of the guide rollers of the crawler belt unit is substantially smaller than the diameter of the front wheel tires for obtaining a center of gravity as low as possible for the superstructures, and the cabin is positioned between the front axle and the front end of the rear axle assembly.

4 Claims, 3 Drawing Sheets

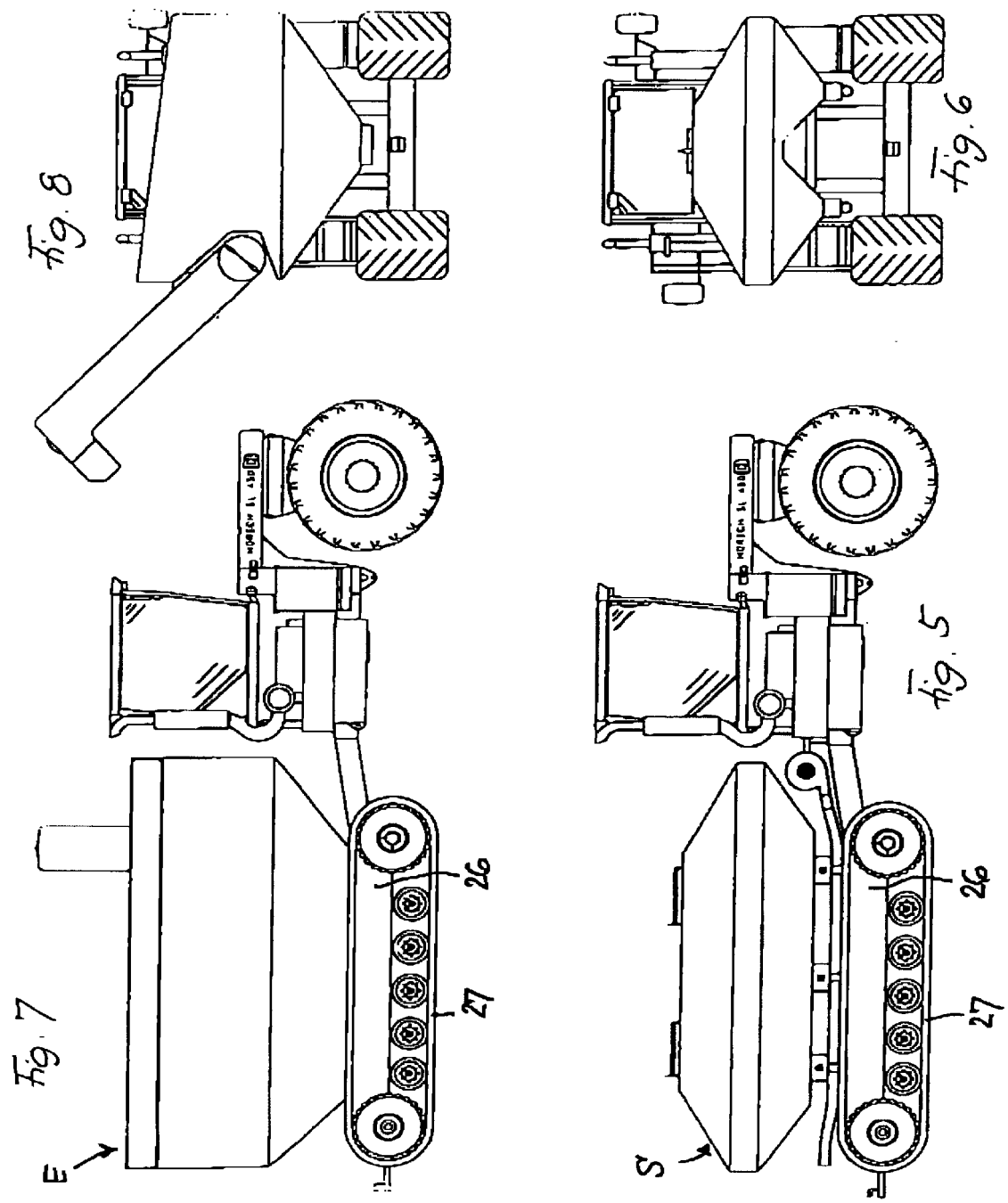

AGRICULTURAL MACHINE

The subject invention refers to an agricultural machine having a loading area above the rear axle assembly, a driver's cabin between front axle and rear axle assembly, an engine within the front area of the vehicle and a front frame associated to the front axle assembly as well a rear frame associated to the rear axle assembly.

DE-OS 27 45 170 discloses an agricultural tractor the rear wheels of which are provided as chain wheels with caterpillar tracks, the driver's cabin is arranged above the caterpillar tracks, the front wheels are wheels with tires with smaller wheel base than the rear chain wheels, and behind the chain wheels, between the chain wheels and the front wheels, and in front of the front wheels means for receiving operating tools are provided, and the driving engine is arranged between the front and the rear wheels.

Furthermore, from DE-OS 195 06 575 lorry-type transport vehicles are known, the rear wheel systems of which are caterpillar track drives, above which the loading area of the vehicle is arranged, and above the front wheel axle of which the driver's cabin is provided. Vehicles of this type have a central rear wheel within the rear area. For driving on public roads the vehicle is lifted off from the caterpillar tracks and is operated as a vehicle running on wheels only.

From DE-AS 18 07 93 a tractor vehicle is known the rear wheels of which are provided with a chain travelling mechanism, and with which the driver's cabin is arranged above the rear axle. For special purposes this type of vehicle will be converted from an operation with rear wheel tires into an operation with caterpillar chain or belt means in addition to the rear wheel tires, in order to reduce the soil pressure and to increase the surface for power transmission.

DE-OS 43 35 657 refers to a crawler-type vehicle with a rubber crawler belt for agricultural harvesters. All the wheels of the vehicle are substituted by track chain travelling assemblies, resulting in an agricultural machine, which can be used as a harvester, however, is not suitable for being used as a machine, such as a tractor, which is to be highly maneuverable and easily steerable.

It is an object of the invention to propose an agricultural machine, preferably a self-propelled machine with minimum soil pressure at maximum load, extremely low centre of gravity of the load to be carried, good maneuverability and steerability, as well high traction power transmission.

In order to solve this object the invention is characterised by the features of claims:

a) the rear axle assembly is provided with a travelling mechanism, preferably a crawler unit with a rubber belt and with a low loading area and a swinging axle, b) the front axle assembly is provided with single tires, c) the frame of the crawler unit is available to its full length and width for carrying net superstructures of the machine, d) the length of the crawler unit and the supporting crawler belts is larger than the width of the crawling unit, e) the diameter of the guide rollers of the crawler unit is substantially smaller than the diameter of the front wheel tires in order to have the centre of gravity as low as possible for the superstructures, f) the cabin is positioned between the front axle and the front end of the rear axle assembly.

With this type of self-propelled agricultural machine the rear axle assembly of the machine is provided with a travelling mechanism or a crawler unit or a track-laying vehicle (in the following specification and in the claims the expression "crawler unit" is used as a synonymous expression), especially a rubber belt travelling mechanism, which results in a very low and very long loading area as well reduced soil pressure, whereas the front portion preferably comprises one individual wheel, arranged within the central longitudinal axis of the machine which wheel is provided with rubber tires, or as an alternative the front wheel is provided with two wheels with rubber tires on the front axle, which travel along the track of the belt crawler unit, which means a combination of wheels and belt travelling mechanism. This results in a good steerability of the machine on the one hand, and allows a high loadability of the rear machine portion above the crawler unit on the other hand. The wheels preferably are provided with wide tires, whereby if an individual wheel is used in the front portion the wheel is supported on the frame by means of a swinging arm. The driver's cabin is positioned in front of the belt crawler unit so that the entire surface of the crawler unit is available for carrying the load, which can be a supply tank, a seed container, a fertilizer container or the like, which in view of the small height of the crawler unit has an extremely low centre of gravity, and thus is most useful for high-volume superstructures.

The frame of the machine is either a continuous frame, which extends from the front wheel or the front wheels along the entire machine backwards, or is provided as a two-part frame, the one part of which is the frame of the crawler unit, and the other part of which supports the front portion, namely the tires, the cabin and the like. In the latter case both frame sections are coupled with each other by means of a link.

The driver's cabin is supported on the front frame portion, whereby the engine and the gear either are arranged directly below the driver's cabin or in front of the front tires in order to obtain an optimum weight distribution. At the front frame portion pick-up means for front tools, lifting devices or the like can abe attached, and at the end of the rear section a power take-off, a traction pendulum and/or a three-point suspension system as well corresponding trailer hitches can be provided.

The driving engine for the crawler unit preferably is a hydrostatic drive driven by a hydromotor. Alternatively, the driving engine is hydrostatically controlled and the wheels and/or the crawler unit is electronically controlled. The crawler unit, especially a rubber belt track mechanism is driven at both sides at the front and the rear guide rollers and preferably is provided with a swinging axis. The rubber belts can be substituted by link belts or caterpillar tracks. By driving the crawler unit at both guide rollers lower tension forces at a higher fractional value are obtained compared with driving only one guide roller.

Instead of a single front wheel or a pair of front wheels according to a further embodiment of the subject invention a crawler unit with an individual travelling belt or a belt track mechanism with a pair of travelling belts can be used. This will result in an even more intensive road traction, an even smaller soil pressure and an even higher loadability. Preferably, the crawler unit adjacent the front axle is provided with a triangularly shaped chain guide.

In the following the invention is described by embodiments shown within the drawings.

Figure 2:
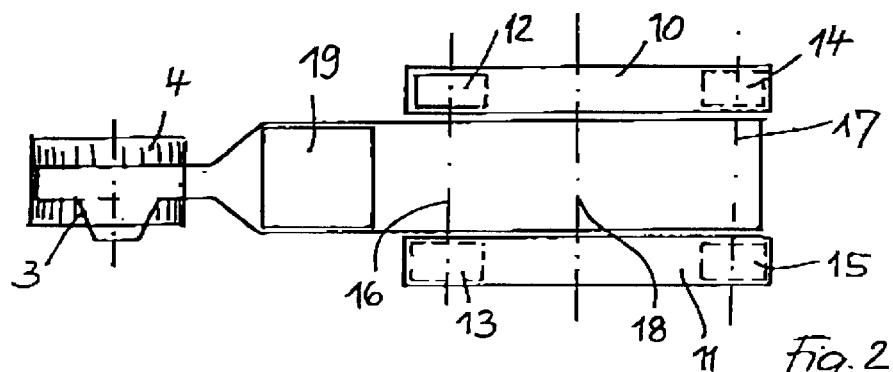
Figure 3:
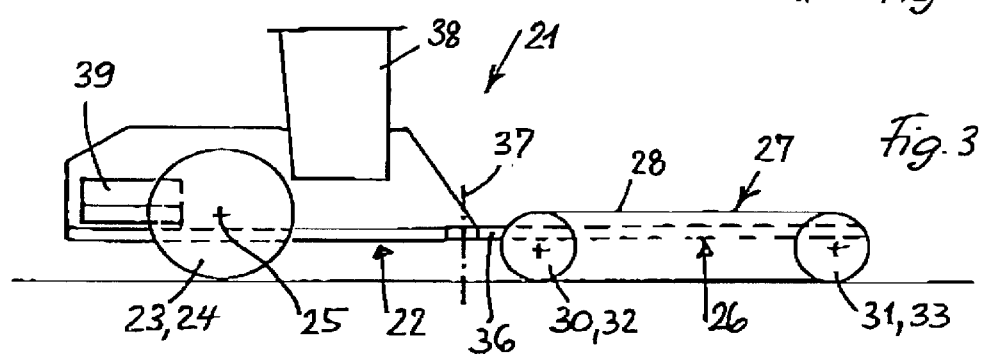
Figure 4:
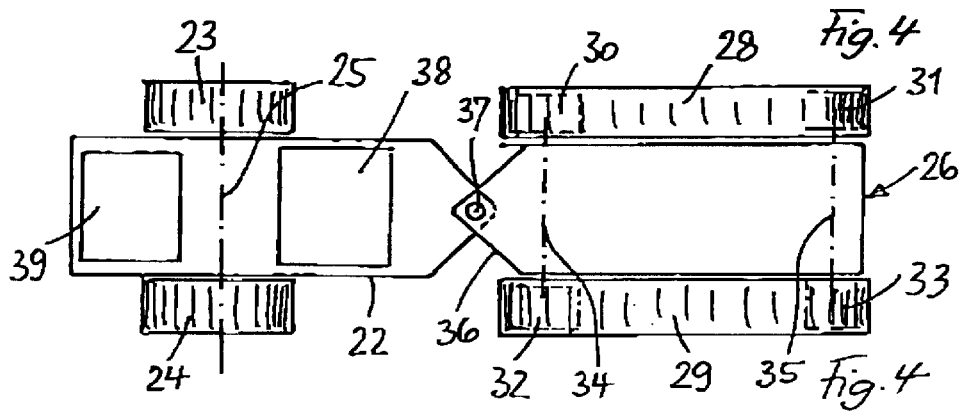
Figure 9:
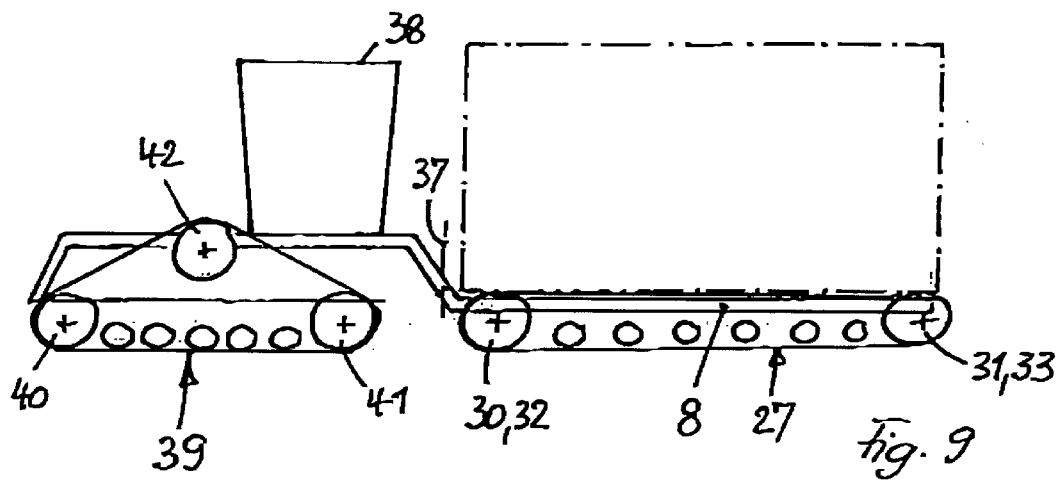
Figure 10:
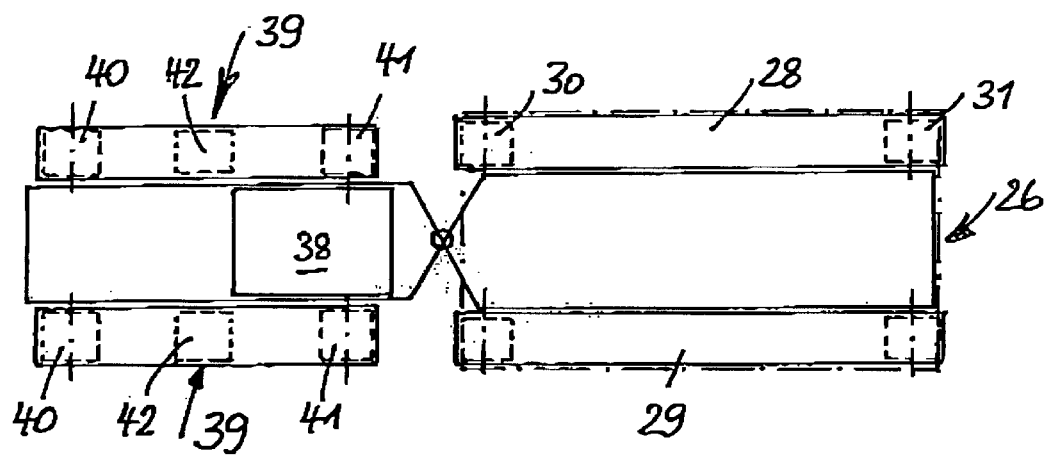

FIG. 1 is a schematic lateral view of an agricultural machine according to a first embodiment of the invention, FIG. 2 is a plan view of FIG. 1, FIG. 3 is a lateral view of a second embodiment of a machine according to the invention, FIG. 4 is a plan view of FIG. 3, FIG. 5 is a further embodiment of the machine according to the invention in lateral view for one type of use, FIG. 6 is a rear view of FIG. 5, FIG. 7 shows a further possibility of use of the machine according to the invention in lateral view, FIG. 8 shows the embodiment of FIG. 7 in a rear view, FIG. 9 is a lateral view of a further embodiment of the invention, and FIG. 10 is a plan view of FIG. 9.

As schematically shown in FIGS. 1 and 2 the machine 1 according to the invention comprises a frame portion 2, to which a swinging arm 3 is attached. The swinging arm supports a front wheel 4 by means of an axle 5. 6 shows the front frame section, 7 the central frame section and 8 the rear frame section. The front portion carries an individual wheel 4 with rubber tire, the rear portion of machine 1 includes a crawler unit or a travelling mechanism 9 with rubber crawler belts 10 and 11, which travel over guide rollers 12, 13, 14, 15 arranged on a front axle 16 and a rear axle 17. A lateral axle 18 which extends transverse to the longitudinal axis of the machine, is a swinging axle, around which the crawler unit is able to swing. The diameter of the guide rollers 12–15 and thus the height of the crawler unit 9 is relatively small, f.e. 50% compared with the diameter of the front wheel 4. The central frame portion 7 carries a driver's cabin 19 and the engine 20 below the floor of the driver's cabin. The swinging arm 3 is supported by the front frame portion, for example by means of a turn table.

According to the embodiment of FIGS. 3 and 4, 21 shows the agricultural machine, 22 the front frame portion, 23, 24 the two wheels with wide tires, 25 the front wheel axle, 26 the rear frame portion, 27 crawler unit or the travelling mechanism, 28 and 30 the crawler belts, 30–33 the guide rollers, and 34, 35 the guide roller axes. The front end of the rear frame portion 26 is provided as a drawbar 36, and the rear frame portion 26 is pivotably connected with the front frame portion 22 by means of a hinge 37. The driver's cabin 38 is attached to the front frame portion adjacent the front wheels. The driving engine 39 with gear rests in front of the front axis 25. The front end of frame 22 can be provided with means for supporting front tools, a lifting device or the like. The rearward end of the rear frame portion 26 is provided with a discharge shaft or an attachment for a subsequent, pulled soil treatment tool or the like.

FIGS. 5, 6 and 7, 8 show two embodiments of use for superstructures, which are taken up by the rear frame portion 26 and the travelling mechanism or crawler unit 27. In FIGS. 5 and 6 this is a seed tank or a fertilizer tank 5, in case of FIGS. 7 and 8 it is a harvest container E, f.e. for receiving grain, corn or the like.

Instead of the front wheels 23, 24 of an embodiment of the vehicle according to FIGS. 3 and 4 or alternatively the single front wheel according to FIGS. 1 and 2 the embodiment of FIGS. 9 and 10 shows a belt travelling mechanism or crawler unit 39, which is provided with lower driving wheels 40, 41 and a driving wheel 42 arranged at a higher position, whereby the belt drive mechanism has the shape of a triangle when seen laterally.

I claim:

1. An agricultural machine comprising:

a) a rear axle assembly and a front axle assembly;

b) said rear axle assembly having a traveling mechanism comprising a low loading area, a wing axle and a crawler unit having a frame, guide rollers and a belt;

c) said crawler unit frame carrying a superstructure on said low loading area of the agricultural machine;

d) said front axle assembly having a single front wheel in a longitudinal direction, which extends centrally between the crawler unit of the rear axle assembly, said front wheel being rotatably supported within a swinging arm of the machine frame, e) said rear frame being associated with said rear axle assembly and the front frame associated with said front axle assembly;

f) the driving mechanism for the front axle assembly and the rear axle assembly being a hydrostatic drive mechanism, and said front wheel and the crawler unit being electronically controlled independent from each other; and g) a driver's cabin being located between said front axle assembly and said rear axle assembly, and the engine being located underneath the cabin floor.

2. The machine according to claim 1, wherein said rear axle assembly receives a container or tank for taking up fertilizer, chemicals or water and quick-release mechanisms are provided for exchanging the container or tank.

3. The machine according to claim 1, wherein the front axle assembly comprises crawler belt units having driving wheels, said driving wheels arranged to form a triangularly shaped belt system.

4. The machine according to claim 1, further comprising at least one front tire on said single-wheel front axle assembly, said guide rollers having a diameter that is smaller than said at least one front tire.

* * * * *